United States Patent
Nagara et al.

(10) Patent No.: US 9,841,884 B2
(45) Date of Patent: Dec. 12, 2017

(54) PROVIDING A SINGLE-ACTION MULTI-MODE INTERFACE

(71) Applicants: Wes A. Nagara, Commerce Township, MI (US); Royce D. Channey, Ann Arbor, MI (US); Michael D. Tschirhart, Ann Arbor, MI (US)

(72) Inventors: Wes A. Nagara, Commerce Township, MI (US); Royce D. Channey, Ann Arbor, MI (US); Michael D. Tschirhart, Ann Arbor, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 314 days.

(21) Appl. No.: 14/179,004

(22) Filed: Feb. 12, 2014

(65) Prior Publication Data

US 2015/0227300 A1 Aug. 13, 2015

(51) Int. Cl.
| | | |
|---|---|---|
| B60R 16/03 | (2006.01) | |
| B60N 2/02 | (2006.01) | |
| B60H 1/00 | (2006.01) | |
| G06F 3/0484 | (2013.01) | |
| G06F 3/041 | (2006.01) | |
| G06F 3/0488 | (2013.01) | |
| B60R 16/037 | (2006.01) | |

(52) U.S. Cl.
CPC ....... *G06F 3/04847* (2013.01); *B60H 1/0065* (2013.01); *B60N 2/0224* (2013.01); *B60N 2/0228* (2013.01); *B60N 2/0248* (2013.01); *G06F 3/041* (2013.01); *G06F 3/0416* (2013.01); *G06F 3/04883* (2013.01); *B60K 2350/1024* (2013.01); *B60K 2350/1028* (2013.01); *B60R 16/037* (2013.01)

(58) Field of Classification Search
CPC .... B60K 2350/1024; B60K 2350/1028; B60R 16/037; B60N 2/028; B60N 2/0228
See application file for complete search history.

(56) References Cited

U.S. PATENT DOCUMENTS

| | | | | |
|---|---|---|---|---|
| 5,670,853 | A | * 9/1997 | Bauer | 318/286 |
| 2005/0280524 | A1 | * 12/2005 | Boone et al. | 340/461 |
| 2010/0156833 | A1 | 6/2010 | Kim et al. | |
| 2010/0318266 | A1 | * 12/2010 | Schaaf et al. | 701/49 |
| 2011/0285186 | A1 | * 11/2011 | Demmelmeier et al. | 297/217.1 |
| 2013/0090816 | A1 | * 4/2013 | Huber | 701/49 |
| 2013/0249861 | A1 | * 9/2013 | Chang et al. | 345/174 |
| 2014/0265479 | A1 | * 9/2014 | Bennett | 297/217.4 |

OTHER PUBLICATIONS

Tesla Motors, Model S A Quick Guide for Owners, 2012, all pages.*

* cited by examiner

*Primary Examiner* — Fadey Jabr
*Assistant Examiner* — Thomas Ingram
(74) *Attorney, Agent, or Firm* — Dickinson Wright PLLC

(57) ABSTRACT

A system and method for providing a single-action multi-mode interface are provided. The system includes a touch detector to detect an input to a touch device; a mode detector to detect a mode associated with the input; a displacement detector to detect a displacement associated with the detected touch and mode, wherein the displacement is defined by a first and second parameter; and a command initiator to transmit an action to a first system based on the first parameter and a second system based on the second parameter.

9 Claims, 5 Drawing Sheets

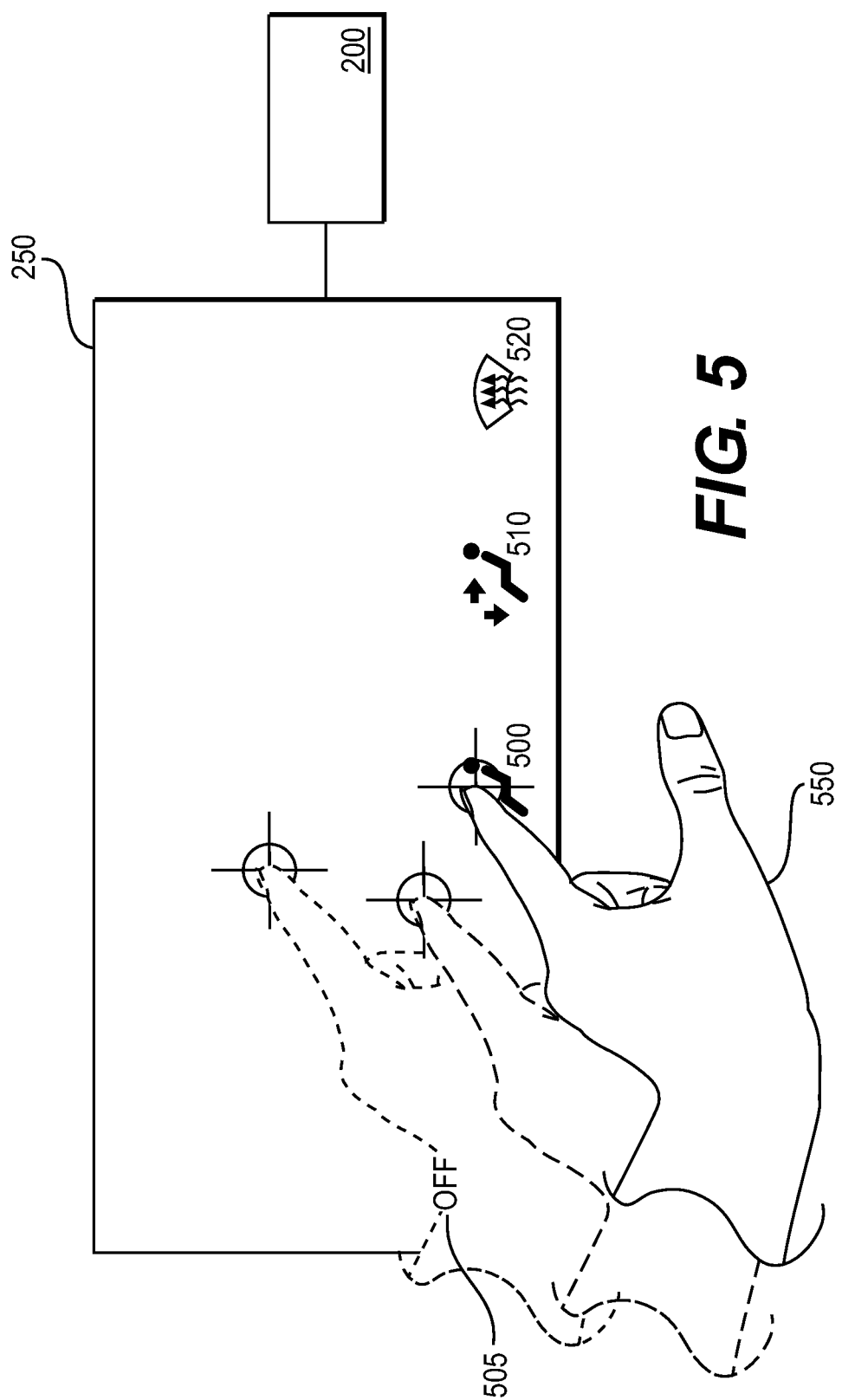

PROVIDING A SINGLE-ACTION MULTI-MODE INTERFACE

BACKGROUND

Interacting with interfaces has traditionally been accomplished with mechanical devices. Accordingly, a user activates a function via a mechanical actuating component, such as a knob, a lever, a switch, or the like. After the mechanical actuating component is engaged, an electrical signal instigates an operation associated with the interface.

For example, if the interface is situated in a vehicle, the various engagements to the interfaces may control various aspects of the vehicle, such as, temperature/climate controls, audio, windows, and the like. Interfaces may be employed in various contexts and systems.

Recently, mechanical interfaces have been replaced with digital interfaces. One such example of a digital interface is touch technology. Touch technology may be implemented with a touch screen or touch surface. For example, a touch screen with either capacitive or resistive touch technology may be employed. Often times, the touch technology replicates the mechanical actuating components. For example, a graphical user interface with a drag bar in one direction may replicate a switch employed to set a temperature or setting.

SUMMARY

A system and method for providing a single-action multi-mode interface are provided. The system includes a touch detector to detect an input to a touch device; a mode detector to detect a mode associated with the input; a displacement detector to detect a displacement associated with the detected touch and mode, wherein the displacement is defined by a first and second parameter; and a command initiator to transmit an action to a first system based on the first parameter and a second system based on the second parameter.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 5 illustrates an example implementation of the system of FIG. 2 being employed in a vehicle.

DETAILED DESCRIPTION

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

Interfaces facilitate the engagement of a user with a system. The actions by the user in engaging the interface may control various facets of the system. For example, in a vehicle, an interface may be employed to control a temperature, audio, or window of the vehicle.

As explained in the background section, mechanical interfaces are being replaced by touch technology. Thus, a touch screen or touch surface may be implemented to assist in the control of a system. The touch technology employs a touch detection device capable of detecting the location and pressure associated with a touch, and based on the location and pressure, a corresponding action is taken.

However, implementations of touch technologies aim to replicate the mechanical interfaces in which the touch technologies are replacing. Accordingly, a limited and non-optimized user experience is achieved. Thus, the advantages associated with switching to a touch technology are ultimately frustrated.

Disclosed herein are methods and systems for providing a single-action multi-mode interface. By providing a single-action multi-mode interface, a user interacting with a system may control a system in an efficient manner, while experiencing an enhanced user experience. The methods and system disclosed herein may be implemented with a vehicle; however, aspects disclosed herein are not limited thereto.

Figure 1:
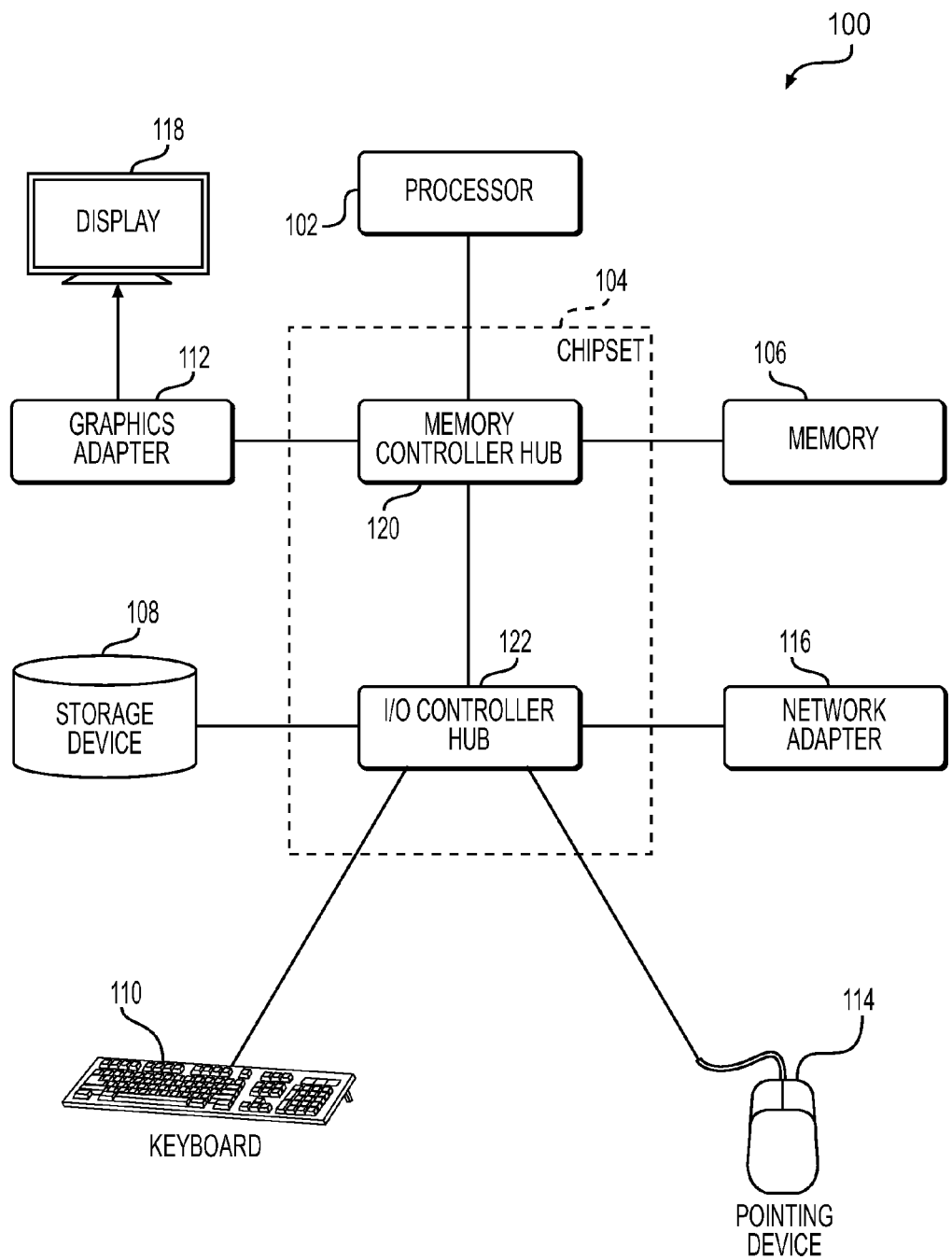
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
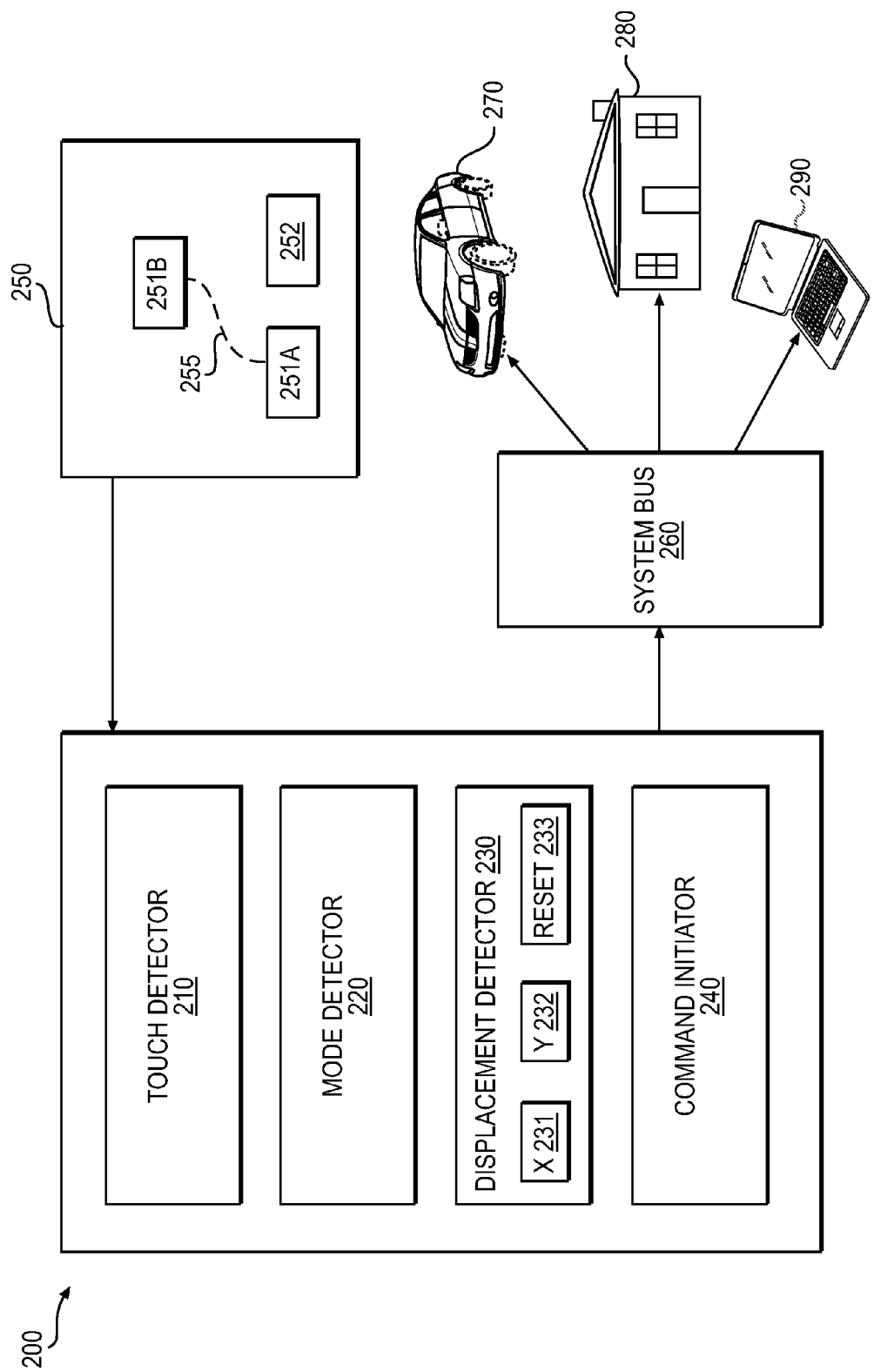
FIG. 2 illustrates an example of a system for providing a single-action multi-mode interface.

FIG. 2 illustrates a system 200 for providing a single-action multi-mode interface. The system 200 includes a touch detector 210, a mode detector 220, a displacement detector 230, a command initiator 240. The system 200 interacts with a touch device 250. The touch device 250 may be any sort of touch receiving device, such as a touch surface or touch screen. Alternatively, instead of a touch device 250, another input mechanism may be employed, such as a gesture controlled input interface, or the like. The system 200 may be implemented via a processor, such as computer 100.

The system 200 communicates with a system bus 260. The system bus 260 includes a processor, such as computer 100, which is configured to control an external system. The system may be, for example, a vehicle 270, a home 280, or an electronic device 290.

The touch device 250 includes a mode 251A and a mode 252. The modes may correspond to various commands associated with the control of system bus 260. Each mode, mode 251a and mode 252, may be associated with multiple controls. For example, the mode 251a may be associated with the temperature of a vehicle 270 and a fan speed associated with an air conditioning unit of the vehicle 270.

As shown in FIG. 2, the mode 251A has been displaced to position 251B. The displacement may occur through any sort of input mechanism, such as touching the touch device 250 to drag or display the mode 251A to the new position 251B. The displacement is indicated by travel path 255, which indicates an X and Y displacement. The X and Y displacement may each correspond to a specific control. For example, the X displacement may correspond to the temperature of the vehicle 270, while the Y displacement may correspond to the fan speed.

The touch detector 210 detects that a touch has been instigated via touch device 250. Accordingly, the touch detector 210 may initiate the operations associated with system 200 to commence the performing of an action or a command. As explained above, the system 200 may be implemented with other input mechanisms that are not touch related.

Alternative to touch detection, the system 200 may employ planar detection (i.e. gesture based inputs that are provided with or without haptics).

The mode detector 220 detects that mode being selected. For example, as shown in FIG. 2, the mode selected is mode 251A. As explained above, mode 251A may correspond to multiple operations. In this way, the engagement with a graphical user interface (GUI) element, mode 251A, may correspond to various modes/operations.

The displacement detector 230 detects a displacement associated with the touch detected via the touch detector 210, and the mode selected via the mode detector 220. Accordingly, the displacement detector may record a displacement path, such as travel path 255, associated with the touch detected by touch detector 210. The displacement detector 230 includes a X module 231, a Y module 232, and a reset module 233.

The X module 231 detects the horizontal displacement associated with travel path 255. The Y module 232 detects the vertical displacement associated with travel path 255. The reset module 233 detects that the mode being selected has been placed in a reset position (for example, the initial position the GUI for a mode was presented in).

In an alternate example, the multi-touch may be permeated with a difference in pressure. Thus, applying one level of pressure may correlate to a first mode, and a second level of pressure may correlate to a second a mode.

The command initiator 240, based on the selected mode and the detected displacement, initiates a command. The command is communicated to the system bus 260. As explained above, the system bus 260 may control various systems, such as a vehicle 270, a home 280, or an electronic device 290.

Specifically, the X displacement may be associated with a first system of the controlled system, while the Y displacement may be associated with a second system. Accordingly, by the user moving the selected mode GUI in an X and Y direction (as denoted via travel path 255), multiple systems may be controlled. As explained above, this may be two different settings associated with a climate control system of the vehicle 270. Additionally, if the user moves the mode back to a reset position (as detected by the reset module 233), the settings associated with the mode GUI may reset the settings to a predetermined initial setting.

Figure 3:
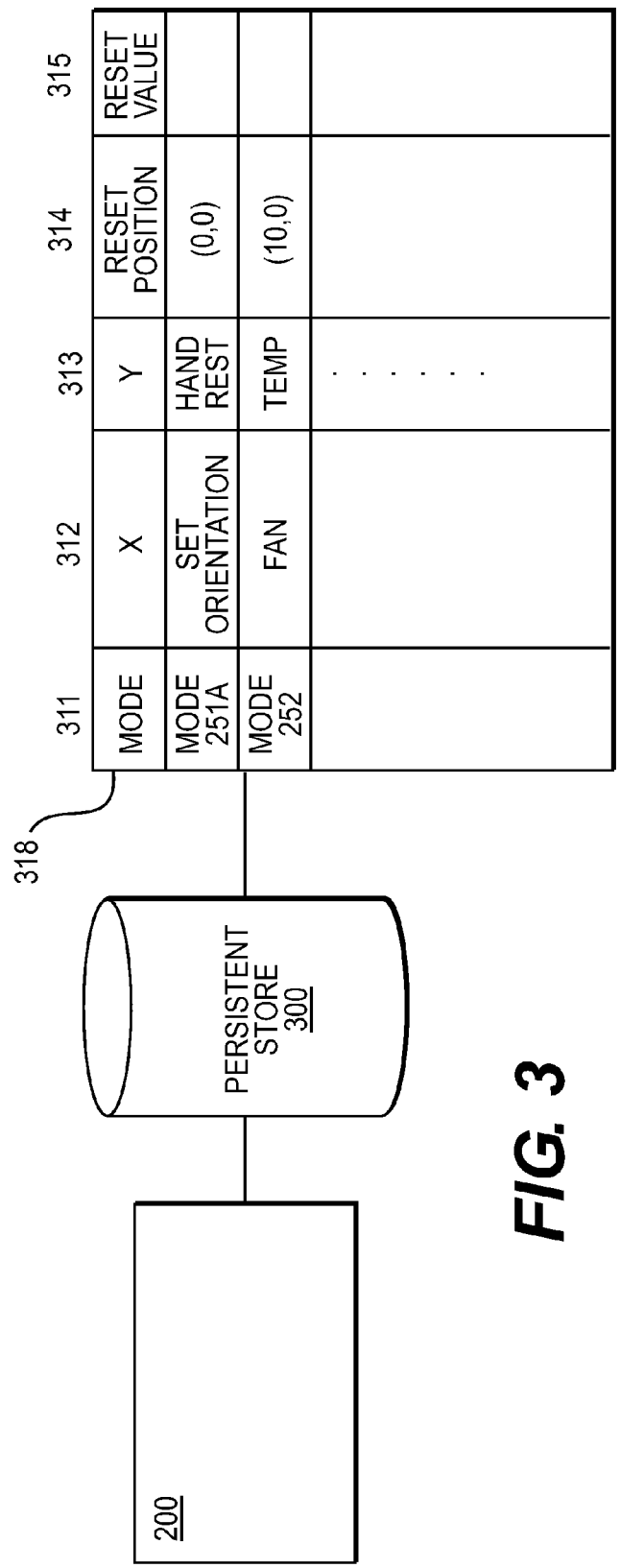
FIG. 3 illustrates an example implementation of the system of FIG. 2.

FIG. 3 illustrates an example configuration for system 200. As shown in FIG. 3, the system 200 described above communicates with a persistent store 300. The persistent store may be any sort of data storage device, such as storage device 108.

The persistent store 300 includes a lookup table 310. The lookup table 310 has various fields associated with the operation of system 200. The implementer of system 200 may populate the fields associated with the lookup table 310. Alternatively, the implementer may provide a user the ability to configure the fields based on the user's preference. Accordingly, the fields shown below are merely exemplary.

The lookup table 310 includes a mode GUI field 311, an X-definition field 312, a Y-definition field 313, a reset position field 314, and a reset value field 315 The mode GUI field 311 is defined for every mode GUI element (such as mode 251A and mode 252).

The mode GUI field 311, as explained above, may be associated with at least two different control operations. For example, in the context of a climate control system associated with a vehicle, a mode may be associated with the fan system and the temperature system. This is exemplified in lookup table 310, where an X-definition field 312 is defined as controlling the fan system, and a Y-definition field is defined as controlling a temperature system. When mode 251A is displaced in the X direction, a fan setting is adjusted, and in the Y direction, a temperature setting is adjusted. Accordingly, a diagonal movement (i.e. movement with both an X and Y component) adjusts both the fan setting and the temperature setting.

The reset position field 314 and reset value field 315 instruct the system 200 based on a detection that the mode associated with the values in each field is in a reset position (as defined by the reset position field 314). Once a detection is made that the corresponding mode associated with the reset position is in the defined coordinate, the corresponding reset value (from the reset value field 315) is set for the operations defined for the mode.

The lookup table may maintain a history of user's movement. Accordingly, various desired values may be stored, and a user's movement to an approximate location may correspond to a historical setting.

Figure 4:
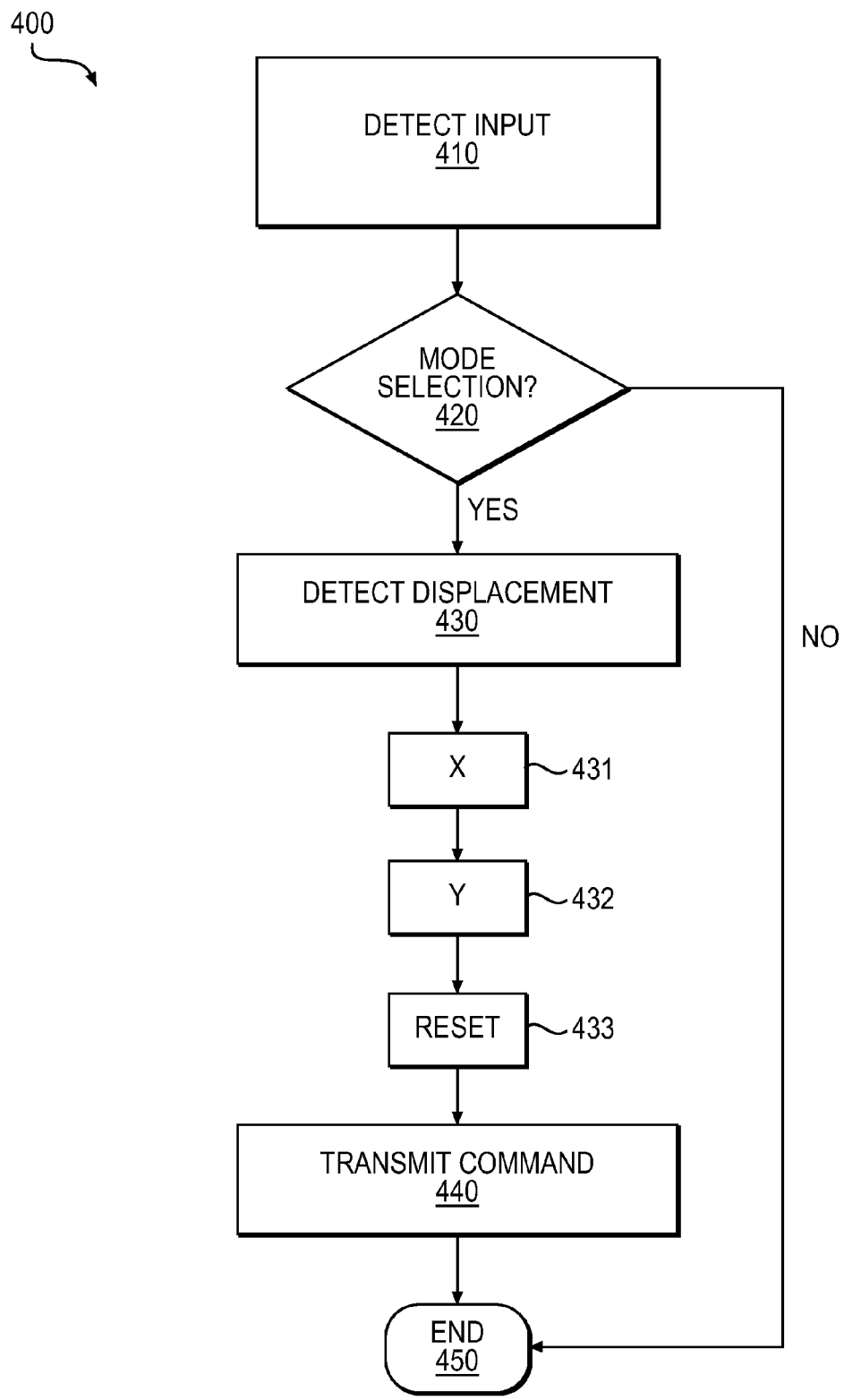
FIG. 4 illustrates an example of a method for providing a single-action multi-mode interface.

FIG. 4 illustrates an example of a method 400 for providing a single-action multi-mode interface. The method 400 may be implemented with a system, such as system 200 described above.

In operation 410, an input to an interface is detected. The interface may serve as a front end for the control of a system, such as those enumerated above with regards to FIG. 2.

In operation 420, a determination is made as to whether a mode is selected. Each mode corresponds to a distinct GUI element. As explained above, the modes may control multiple operations (for example, see the definition in FIG. 3). The mode may be selected by a user engaging an interface (for example, a touch device), and selecting a moving the mode. If no mode is selected, the method 400 proceeds to the end 450.

In operation 430, a displacement associated with the selected mode is ascertained. Specifically, the X displacement (431), Y displacement (432), or if the mode is returned to a reset position (reset 433) is calculated or determined. The displacement corresponds to the physical distance that the mode has been moved. Each displacement direction, may correspond to a specific operation.

In operation 440, a command associated with the displaced GUI element is transmitted to a processor or microcontroller associated with controlling the electronic system that method 400 is associated with. Accordingly, a first mode may be changed based on the X displacement detected (441), and a second mode may be changed based on the Y displacement detected (442). If the mode is brought back to the reset position, an initial value may be set for both the first and second modes.

FIG. 5 illustrates an example implementation of system 200 in a vehicle. As shown, the vehicle has a touch screen display 250. The touch screen display 250 has three GUI element, seat control 500, climate control 510, and defrost control 520. Each GUI element may be associated with two different modes. For example, the seat control 500 may be associated with a side-by-side movement and a raising/lowering movement of a seat. The climate control 510 may be associated with a fan setting and a temperature setting. The defrost control 520 may be associated with a front window defrost and a back window defrost. The touch screen display 250 also includes an off button 505.

As shown in FIG. 5, user 550 touches the GUI element 500 and moves the GUI element 500 in both an X and Y direction. Based on the movement of both the X and Y direction, and a defined correspondence to multiple modes, the various modes associated with the GUI element 500 may be changed.

Thus, according to the aspects disclosed herein, because a single operation may be employed to manipulate multiple modes of operation, a user is provided an enhanced ability to control mechanical and electrical system via an interface. Further, when specifically implemented in the context of a vehicle interface, the user is no longer limited to controls that replicate mechanical methods for interacting with interfaces. Accordingly, an enhanced user experience is achieved.

While examples of the disclosure have been illustrated and described, it is not intended that these examples illustrate and describe all possible forms of the disclosure. Rather, the words used in the specification are words of description rather than limitation, and it is understand that various changes may be made without departing from the spirit and scope of the disclosure. Additionally, the features and various implementing embodiments may be combined to form further examples of the disclosure.

We claim:

1. A touch screen device with a single-action multi-mode interface, comprising:
    a first graphical user interface (GUI) element associated with a first mode and a second mode;
    a circuit to communicate a signal to a controller an X displacement and a Y displacement associated with the first GUI element, the X displacement and the Y displacement being provided to control at least two components of the vehicle;
    wherein in response to the first GUI element being displaced, the first mode is controlled by the X displacement and the second mode is controlled by the Y displacement,
    a second GUI element associated with a third mode and a fourth mode, wherein in response to the first GUI element being displaced, the third mode is controlled by the X displacement and the fourth mode is controlled by the Y displacement.

2. The device according to claim 1, wherein the device is installed in a vehicle.

3. The device according to claim 2, wherein the first mode and the second mode are seat adjustment controls.

4. The device according to claim 2, wherein the first mode and the second mode are climate control settings.

5. The device according to claim 2, wherein the first mode and the second mode are configurable by a predetermined setting.

6. The device according to claim 1, wherein the first GUI element being displaced includes a displacement in both the X displacement and Y displacement.

7. The device according to claim 1 wherein the first GUI element and the second GUI element are each individually configured to be associated with a vehicle's control system independent of each other.

8. The device according to claim 7 wherein the first GUI element controls a seat position, and the second GUI element controls a climate control system, the first GUI element and the second GUI element being displaceable in both the X and Y directions on a same touch screen.

9. The device according to claim 8, wherein a displaceable area of the touch screen associated with the first and second GUI element is the same.

* * * * *